United States Patent [19]

Souchay et al.

[11] Patent Number: 4,479,252
[45] Date of Patent: Oct. 23, 1984

[54] DEVICE FOR REDUCTION OF THE FALSE ALARM RATIO AND MONITOR RECEIVER COMPRISING SUCH A DEVICE OF THIS NATURE

[75] Inventors: Philippe Souchay; Maurice Glorie, both of Paris, France

[73] Assignee: Thomson-CSF, Paris, France

[21] Appl. No.: 425,512

[22] Filed: Sep. 28, 1982

[30] Foreign Application Priority Data

Oct. 9, 1981 [FR] France ................ 81 19703

[51] Int. Cl.³ .................... H04B 1/10; H04B 17/00
[52] U.S. Cl. ........................ 455/223; 455/225; 455/226; 455/229
[58] Field of Search ......... 455/212, 213, 218, 222–229

[56] References Cited

U.S. PATENT DOCUMENTS

| | | | |
|---|---|---|---|
| 3,462,691 | 8/1969 | McDonald | 455/223 |
| 3,745,465 | 7/1973 | Stover | 455/226 |
| 3,873,926 | 3/1975 | Wright | 455/225 |
| 3,889,192 | 6/1975 | Schiebelhuth et al. | 455/222 |
| 3,894,285 | 7/1975 | Schaeperkotter | 455/225 |
| 3,995,220 | 11/1976 | Hansen | 455/225 |
| 4,020,421 | 4/1977 | Elder et al. | 455/229 |
| 4,034,340 | 7/1977 | Sant'Agostino | 455/226 |
| 4,114,105 | 9/1978 | Duncan | |
| 4,143,325 | 3/1979 | Kahn | 455/222 |
| 4,371,981 | 2/1983 | King et al. | 455/222 |
| 4,388,731 | 6/1983 | King | 455/225 |

FOREIGN PATENT DOCUMENTS

| | | | |
|---|---|---|---|
| 2725068 | 12/1978 | Fed. Rep. of Germany | 455/229 |
| DE2812954 | 10/1979 | Fed. Rep. of Germany | |
| 2290797 | 6/1976 | France | |
| 0139414 | 12/1978 | Japan | 455/212 |

OTHER PUBLICATIONS

R. T. Hart, "Blank Noise Effectively with FM", Electronic Design, vol. 26, No. 18, (Sep. 1, 1978).

Primary Examiner—Marc E. Bookbinder
Attorney, Agent, or Firm—Oblon, Fisher, Spivak, McClelland & Maier

[57] ABSTRACT

A monitor receiver incorporating a device for reducing the false alarm ratio comprises a frequency changer, a wobbulated oscillator, two band pass filters of which the central frequencies are constant and staggered, two logarithmic amplifiers and two energy detectors, which makes it possible to measure the energy on two staggered frequencies. The logic alarm signal supplied by the comparator is transmitted via a gate inhibited by means for detecting pulsed noises having an energy level greater than a value S', and validated by means of detecting signals of higher energy than a value S". The threshold values S' and S" are calculated by calculator means as a function of the mean value of the energy of the medium and long term persistent noise on frequencies close to the frequency monitored.

8 Claims, 3 Drawing Figures

DEVICE FOR REDUCTION OF THE FALSE ALARM RATIO AND MONITOR RECEIVER COMPRISING SUCH A DEVICE OF THIS NATURE

The present invention relates to devices whereby it is possible to reduce the ratio of false alarms initiated by a receiver for monitoring a band of radioelectric frequencies.

BACKGROUND OF THE INVENTION

A monitor receiver has the task of detecting any radioelectric emission present in a particular frequency band, referred to as a sub-band, formed by a part of the VHF band for example, and of triggering an alarm when an emission is detected. The detection of interference emissions, in particular of natural noises, is the reason for the triggering of undesirable false alarms.

The noise picked up by the receiver antenna comprises three kinds of noise:

transient noise of pulsed nature, medium term persistent noise, of which the characteristics are liable to vary in time and as a function of the frequency band monitored, long term persistent noise, for example of thermal origin.

A monitor receiver primarily comprises an energy detector preceded by a fixed frequency filter and a frequency changer enabling reception on a variable frequency, or preceded by a bank of filters. It is usual to couple the energy detector to a fixed threshold comparator to trigger an alarm when a signal received has an energy level exceeding the value of the threshold. This value may be preset to exceed the mean value of the long term persistent noise.

The disadvantage of a device of this kind is that the noises of the first two kinds cannot be eliminated and that it therefore has a high false alarm ratio.

The object of the present invention is to overcome this disadvantage.

SUMMARY OF THE INVENTION

In accordance with the invention, a device for reducing the false alarm ratio for a radioelectronic monitor receiver having a first output delivering a logic alarm signal when a signal is received on a monitored frequency, and a second output delivering a value for the energy of the signal received, comprises a logic gate having an input coupled to the first output of the monitor receiver, having a validation input, an inhibition input and an output forming the output of the device, means for comparing the energy of the signal received by the monitor receiver with respect to a variable value $S''$, having a first input connected to the second output of the monitor receiver, a second input receiving the value $S''$, and an output supplying a logic signal to the validation input of the gate in order to validate the same when the signal received has an energy value higher than $S''$, means for detecting a pulsed noise signal emitted on the frequency monitored and for comparing its energy with respect to a variable value $S'$, having an input receiving the value $S'$ and an output connected to the inhibition input of the gate, for inhibiting the same when a pulsed noise signal has an energy value exceeding $S'$;

means for determining a value B of the energy of noise signals emitted in a frequency band encompassing the frequency monitored and calculating the values $S'$ and $S''$ as a function of B.

The invention also provides a monitor receiver comprising a device of this nature.

BRIEF DESCRIPTION OF THE DRAWINGS

The invention will be better understood and other features thereof will appear from the following description taken in conjunction with the accompanying drawings, in which.

DESCRIPTION OF THE PREFERRED EMBODIMENT

Figure 1:
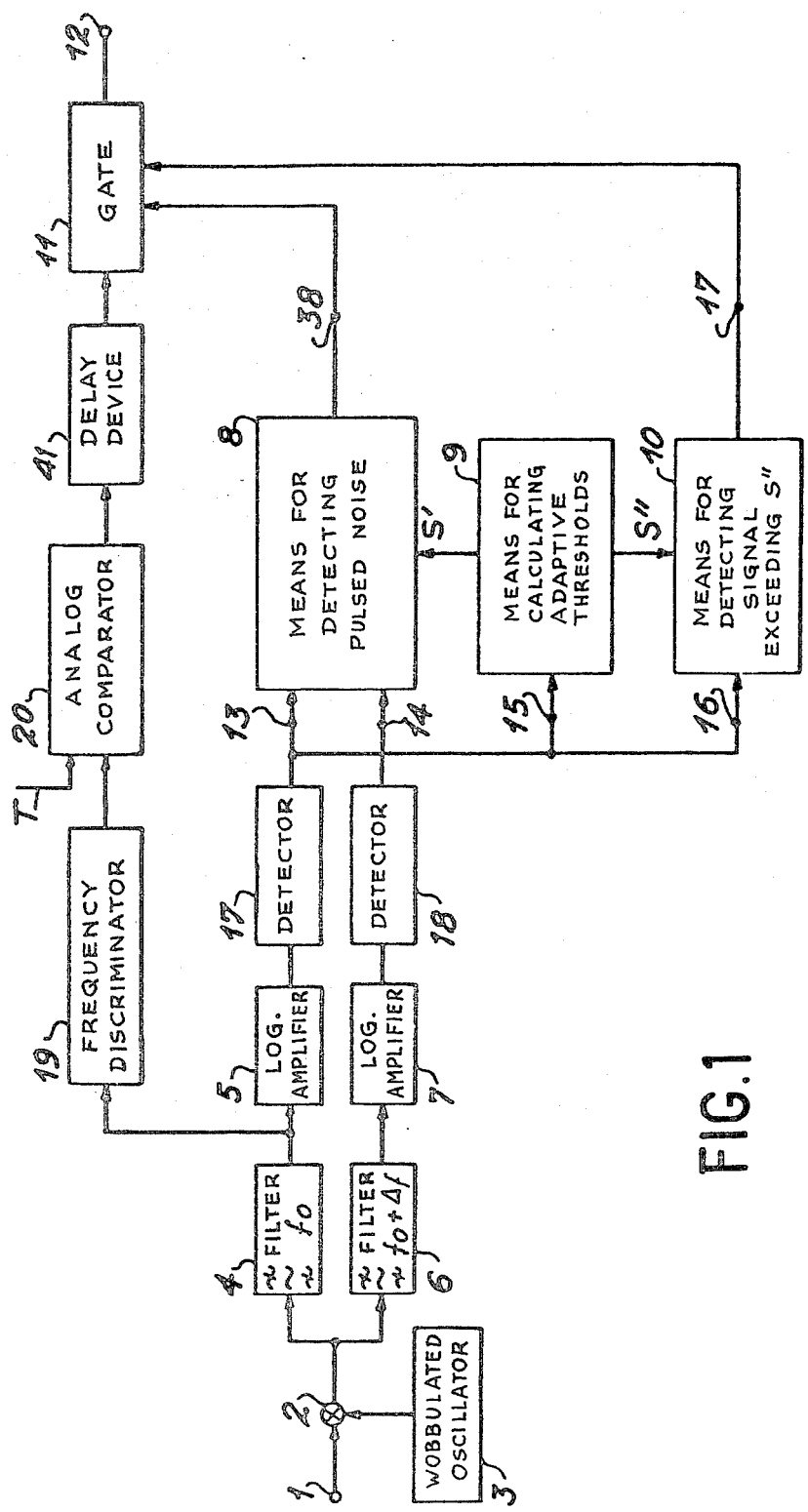
FIG. 1 is a block diagram of an embodiment of a monitor receiver comprising a device according to the invention.

FIG. 1 illustrates the block diagram of an embodiment of a monitor receiver equipped with a device according to the invention. The signal received by an antenna is fed via an input 1 to a frequency changer 2. The latter also receives a signal having a wobbled frequency from a local oscillator 3. The output of the frequency changer 2 is fed to a first band pass filter 4 having a central frequency $f_o$ which is coupled to an unsaturated frequency discriminator 19. This discriminator is highly selective, that is to say that it delivers a very brief pulse when the tuned frequency changes to a frequency at which a transmission intervenes. The amplitude of this pulse renders it possible to ascertain the energy of the detected transmission. It is compared to a fixed threshold T by means of an analog comparator 20. The output of this comparator provides a logic alarm signal when the signal received has a greater amplitude than the threshold T, which corresponds to the energy of the weakest transmissions to be detected. The frequency changer 2, the wobbulated oscillator 3, the filter 4, the discriminator 19 and the comparator 20, form a conventional monitor receiver. The signal provided by the comparator 20 makes it possible to raise the alarm when an emission is picked up, but the false alarm ratio is unfortunately high.

The receiver according to the invention also comprises a logic gate 11 which has applied to it the signal provided by the comparator 20. This gate allows this signal to pass only in the case in which it is validated at the same time by a logic signal delivered by means 8 for detecting pulsed noises and by a logic signal supplied by means 10 for detecting signals having an energy exceeding a threshold $S''$.

The output of the frequency changer 2 feeds a second band pass filter having a central frequency $f_o + \Delta f$, and a pass band b equal to that of the first filter. For each value of the frequency of the local oscillator, the receiver can thus receive on a first and a second channel of which the central frequencies differ by $\Delta f$.

The two band pass filters 4 and 6 are coupled respectively to two logarithmic amplifiers 5 and 7 which make it possible to amplify the signals received with a very high dynamic factor. Each of these amplifiers feeds an energy detector 17 and 18 respectively, which delivers an analog value of the energy received in the channel monitored. The value supplied by the detector 17 is transmitted to means 9 for calculating two adaptive thresholds via an input 15, to the mean 8 for detecting pulsed noises via an input 13 and to the means 10 for detecting signals having a higher energy level than a threshold having the value S'', via an input 16. The value supplied by the detector 18 is transmitted to the means 8 for detecting pulsed noises via an input 14. The means 9 for calculating adaptive thresholds establishes two threshold values S' and S'' as a function of the mean energy of the long and medium term persistent noises within a frequency band encompassing the frequency monitored. These threshold values are fed, respectively to the detection means 8 and 10. When a non-interference signal is received, the detection means 10 detect a signal of higher energy than the threshold S'' whereupon they feed a logic validation signal to the gate 11 via their output terminal 17.

The detection means 8 feed a validation signal to the gate 11 via the output 38, except when the receiver receives a pulsed noise. In this latter case, two signals of higher energy level than the threshold S' are detected at the same time at the output of the two filters 4 and 6, since a pulsed noise has a very wide spectrum. The detection means 8 then momentarily suppress the validation of the gate.

The gate 11 consequently transmits the logic alarm signal only in the case in which the signal received is not attributable to a pulsed noise and its energy level exceeds the threshold S'' which is selected higher than the mean amplitude of the long and medium term persistent noises.

The logic alarm signal provided by the comparator 20 is transmitted to the gate 11 via a delay device 41 which provides delay corresponding to the reaction delay of the detection means 8 and 10.

Figure 2:
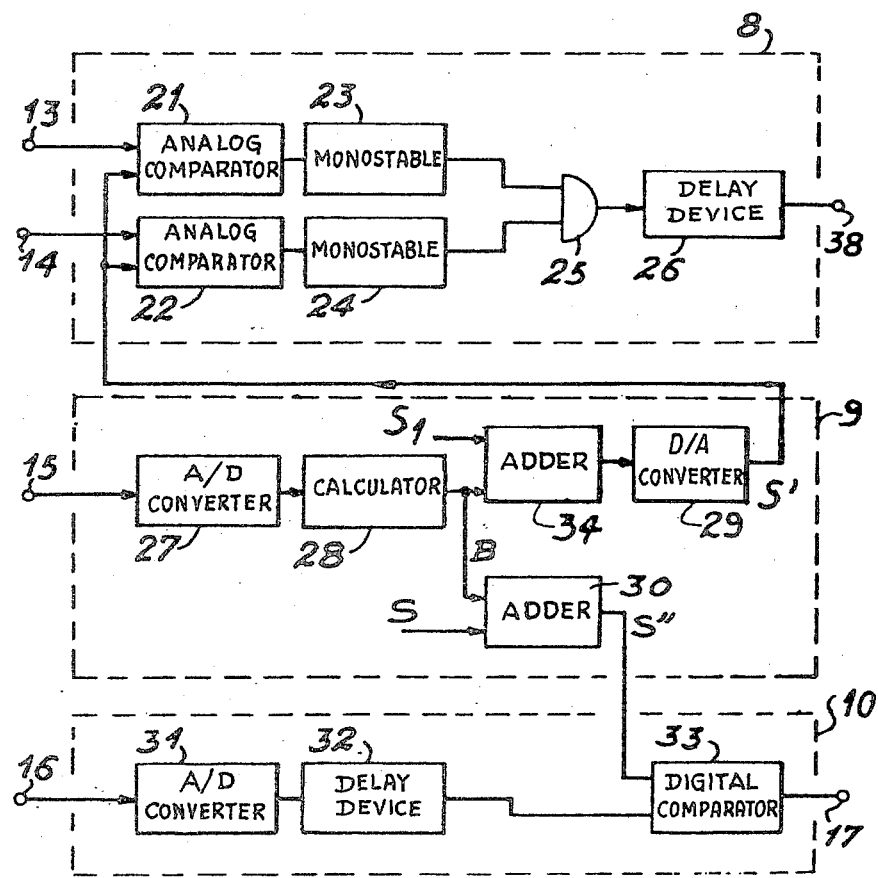
FIG. 2 is a more detailed block diagram of a part of this receiver.

FIG. 2 is a more detailed partial block diagram of the embodiment described above. The input 15 of the means 9 for calculating adaptive thresholds transmits an analog value of the energy of the signal received to the input of an analog/digital converter 27. The digital value it generates is fed to an input of the calculator means 28 which establish a mean value B of the energy of the long and medium term persistent noises within a band centred on the tuning frequency of the first channel of the receiver. The value B is fed to a first input of a digital adder 34 receiving a fixed value $S_1$ at a second input. The digital value $B + S_1$ supplied by the adder 34 is converted into an analog value forming the value of the threshold S' by means of a digital/analog converter 29. On the other hand, the digital value B is fed to a first input of an adder 30 which—on a second terminal—receives a fixed digital value S. The value provided by the output of the adder 30 forms the threshold value S''. This value may be adjusted as a function of the acceptable false alarm ratio and of the sensitivity required. If the value of the threshold S'' is increased, the false alarm ratio is reduced but the sensitivity of the receiver is diminished.

The pulsed noise makes itself apparent by occupying a very wide instantaneous spectrum, contrary to other noises whose instantaneous spectrum is very narrow, and contrary to the non-interference transmissions. This characteristic makes it possible to discriminate pulsed noises. The means 8 for detecting pulsed noises are supplied via the input 13 and 14 with the analog values of the signals received at one and the same instant in both channels monitored. These values are supplied respectively to a first input of an analog comparator 21 and to a first input of an analog comparator 22. The threshold values S' is fed to a second input of each of these comparators 21 and 22. Each of these comparators has an output triggering a monostable multivibrator 23 and 24 respectively, coupled to the corresponding first and second inputs of a logic AND gate 25. An output of this logic gate 25 provides a logic signal if, and only if, each of the channels monitored simultaneously receives a signal of greater amplitude than the threshold S'. This logic signal is delayed by a time delay device 26 and is then supplied via the output 38 to a first input of the gate 11 to inhibit the same.

The means 10 for detecting signals of greater energy than a threshold S'' are supplied via the input 16 with an analog value of the energy of the signal received on the first channel. This value is put into digital form by an analog/digital converter 31 which may be combined with the analog/digital converter 27 of the calculator means 9. The digital value supplied by the converter 31 is time delayed by a delay device 32 and is then fed to a first input of a digital comparator 33. A second input of this comparator 33 receives the threshold value S'' and an output delivers a logic signal if the value of the energy received exceeds the threshold value S''. This logic signal is applied via the output 17 to a second input of the gate 11 to validate the same.

The fixed value S is chosen to exceed the value $S_1$.

$$\left. \begin{array}{l} S'' = S + B \\ S > S_1 \\ S' = B + S_1 \end{array} \right\} \longrightarrow S'' > S'$$

The threshold value S' is lower than the threshold value S'' for more satisfactory assurance of the detection of pulsed noises. As a matter of fact, the probability of simultaneous detection, on the two channels, of an interference signal is lower than the probability of its detection on the first channel only.

The delay device 32 provides a period of delay for the means 9 for calculating thresholds to perform the calculation of the mean value of the energy of the noise.

The logic signal supplied by the detector means 10 has a particular delay with respect to the instant of reception of an emission. In order that the logic signal provided by the detector means 10 may coincide with the logic signal provided by the detector means 8, the latter comprises the said delay device 26.

The value of the frequency difference Δf is chosen to be sufficiently great so that a non-interference transmission having a considerable frequency deviation is not taken for a pulsed noise.

Figure 3:
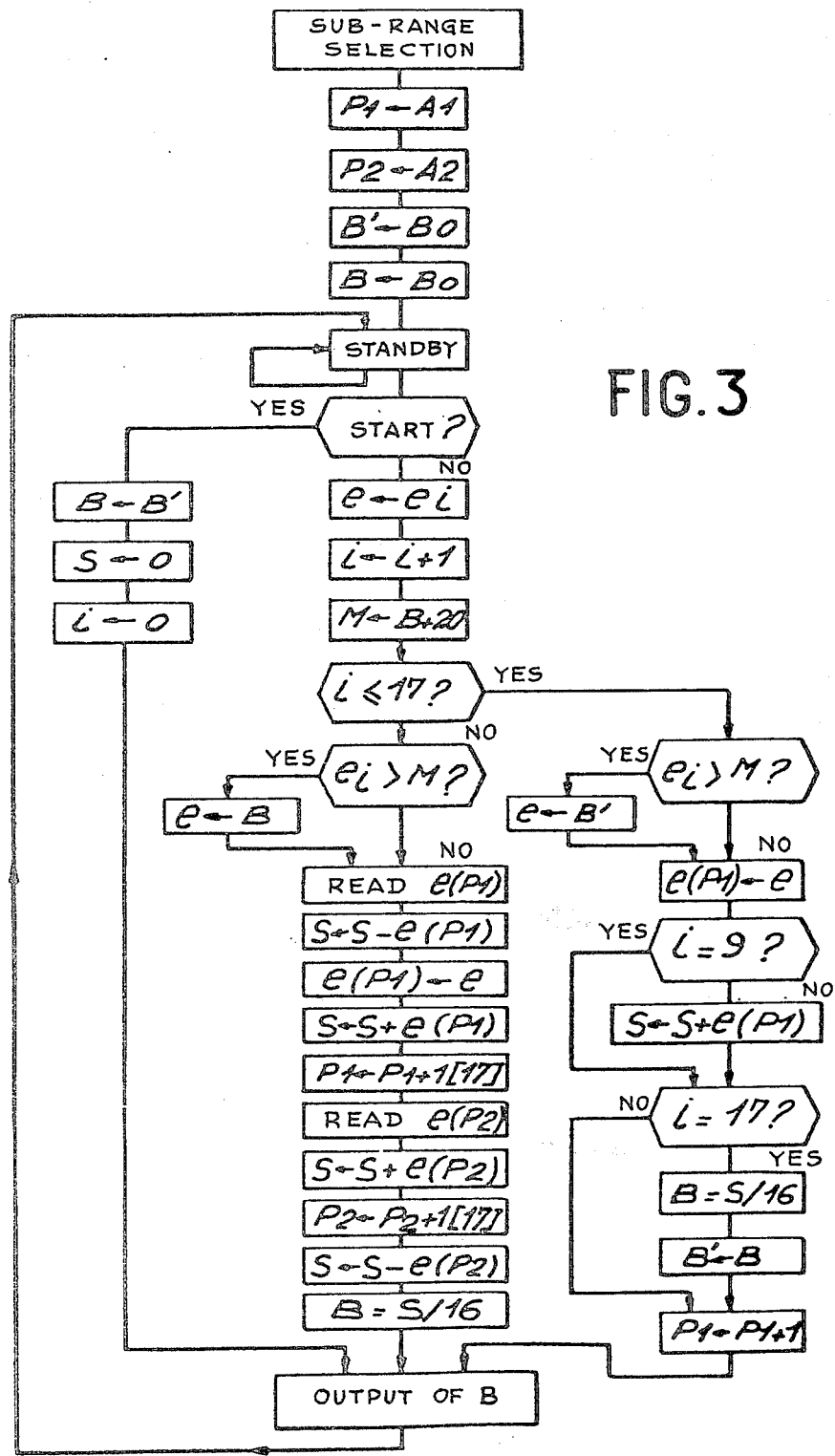
FIG. 3 is an organisational diagram of the operation of a part of this receiver.

FIG. 3 illustrates an example of an organisational diagram for the operations performed by the calculator means 28 to provide a mean value B of the energy of the long and medium term persistent noises present on a channel having a width b.

The value B varies considerably as a function of the portion of the frequency spectrum in question, which is why B is calculated over a narrow frequency band centred on the frequency of the channel monitored and being displaced with the same. At each sampling instant, the analog/digital converter 27 supplies a value of the energy received on a channel of the width b. In this example, the value B is the mean value of the energies received successively on sixteen adjacent channels situated within the spectrum, at either side of the channel monitored. The number of channels is selected to be sufficiently high so that the fluctuations of the mean value B at each channel change remain negligible. The smoothing action is enhanced, the higher the number of channels, but this number is limited by the complexity of the embodiment on the one hand, and on the other hand by the need to consider only frequencies close to the frequency monitored.

During the initial sweep of the sub-band to be monitored, this value B cannot be calculated during seventeen sampling periods, since the sixteen energy values are not yet available. During this period of time, the mean value of the noise energy utilised to calculate S' and S'' is the value B' calculated during the preceding sweep of this sub-band start. When a sub-band is swept for the first time, this value B' is replaced by a value $B_o$ set once and for all.

The value of the energy received in the $i^{th}$ channel is denoted by $e_i$, in which i is a positive integer. This value is considered only if it does not exceed a maximal value M to avoid falsification of the mean when a non-interference emission is received on one of the sixteen channels. On the other hand, the value of the energy received on the middle channel being monitored, is disregarded. The energy values exceeding M are replaced by a value equal to the mean value B. For example, the value M is equal to the value B+20 dB and varies as a function of B.

The calculator means 28 comprises, in this example, a microprocessor and RAM and ROM memories. The values of the energy received are stored in a tubulator allowing the storage of seventeen values, two location registers rendering it possible to ascertain the oldest value address and the address of the energy value received on the channel monitored.

The sequence of operations commences at the instant in which the sub-band to be swept is selected.

A first location register $P_1$ denoting the earliest address of the seventeen values stored, is initialised to a value $A_1$, being the lowest address value amongst the memory divisions assigned to form the energy value register.

Let $e(P_1)$ be the contents of the memory division located by the first location register $P_1$.

A second location register $P_2$, denoting the address of the energy value received on the channel monitored, is initialised to a value $A_2$ being the median address value in the register.

Let $e(P_2)$ be the contents of the memory division located by the second location register $P_2$.

A register designated B' is intended to contain the mean value B' of the energy of the noise received on the first seventeen channels of the sub-band when it has already been swept at least once. Since this does not apply in the case in question, it is thus initialised with the fixed value $B_o$.

$$B' \leftarrow B_o$$

A register referred to as B, is intended to contain the mean value B of the energy of the noise received on the sixteen channels. It is initialised with the same value $B_o$.

$$B \leftarrow B_o$$

The microprocessor then describes a standby loop until it receives an interruption signal. There may be two kinds of interruption: a first kind of interruption announces the onset of a sweeping action on the sub-band. A second kind announces that an energy value $e_i$ is ready to be processed.

In the first kind, the value B' is transferred instead of the value B.

$$B \leftarrow B'$$

If the sub-band is swept for the first time $B=B'=B_o$, or else $B=B'$, being the mean value of the energy of the noise on the first seventeen channels of the sub-band, calculated during the preceding sweep operation. A register referred to as S, intended to store a value S of the sum of sixteen energy values, is initialised to zero. A register referred to as i, intended to count the order i of the energy value $e_i$ received, is initialised to O:

$$S \leftarrow O$$

$$i \leftarrow O$$

The value $B=B'=B_o$ is then supplied at the output of the microprocessor and the latter reverts to standby condition. The value $B=B_o$ thus available even before the processing of the energy value received on the first channel, renders it possible to set the threshold S' and S'' for monitoring the first seventeen channels of the sub-band during its first sweep.

The second kind of interruption announces that an energy value is ready to be processed. This value $e_i$ is read by the microprocessor and is stored in a register referred to as e:

$$e \leftarrow e_i$$

The register i is incremented by one unit:

$$i \leftarrow i+1$$

A register referred to as M is intended to store the maximal value M. It is charged with the value B+20 dB:

$$M \leftarrow B+20 \text{ dB}$$

The contents of the register i are checked, and if they amount to less than seventeen or are equal to 17, the processing operation is merely in an initial stage in which it is as yet impossible to calculate a mean value B over 17 values. The sequence of operations consequently comprises a particular branch which performs the following operations:

The energy value $e_i$ received, contained in the register e, is compared to the value M and is replaced by the value $B'=B_o$ if it exceeds the value M, otherwise it remains unchanged.

$$e>M => e \leftarrow B'$$

The value $e_i$ or the value replacing the same, is then entered in the register at the address located by the first location register $P_1$.

$$e(P_1) \leftarrow e$$

The first value $e_1$ is consequently entered into the first address of the register, the second value $e_2$ into the second address, a.s.o.

The register i is checked; if its content differ from 9 (i<9 or i>9), the last value received or the value B' replacing the same is added to the contents of the register S,

S←S+e(P₁)

Otherwise S is unchanged. The ninth value e₉ corresponding to the channel monitored, is disregarded.

The contents of the register i are checked for a last time, if their value reaches 17, it is possible to calculate the first mean value B.

B=S/16

This value B will then be utilised during the starting stage of the next sweep operation, instead of the arbitrary value $B_o$. To keep the same, it is stored in the register B':

B'←B

The first location register is incremented by one unit.

P₁←P₁+1

The value B is transmitted on the output of the microprocessor, whereupon the latter reverts to standby awaiting an interruption.

If, after input of a value $e_i$, the check on the contents of the register i denotes that the order i exceeds 17, the value $e_i$ is processed in a third branch.

A sliding mean is calculated in this third branch. The register is updated as though the values were within a shift register. The value $e_i$ contained in the register e is compared to the value M and replaced by the value B determined beforehand, if $e_i$ exceeds M. Otherwise $e_i$ is unchanged.

The value $e_i$ or B is written into the register instead of the earliest value e(P₁) located by the register P₁. Just before being replaced by $e_i$, the earliest value has however been read and subtracted from the contents of the register S:

S←S−e(P₁), then e(P₁)←e

The first location register P₁ is then incremented by one unit, modulo 17, to locate the value corresponding to the channel monitored at the instant in question. This value e(P₂) is then read and thereupon subtracted from the contents of the register S:

P₂←P₂+1 [17]

S←S−e(P₂)

The sum of the energies received on the sixteen channels encompassing the channel monitored having been determined, it is sufficient to divide the same by 16 to obtain the mean value B of these energies.

B=S/16

The mean value B is supplied at the output of the microprocessor, whereupon the latter passes into the standby mode awaiting an interruption.

The value B applied to establish the detection thresholds on an $j^{th}$ channel is calculated after having swept the frequencies of the j−8th channel and up to the j+8$^{th}$ channel. The logic alarm signal corresponding to the $j^{th}$ channel is delayed by the time delay device 41 to make up for the delay in calculating the value B and the signals for validating the gate 11.

The construction of the calculator means 28 lies within the scope of one versed in the art. Many modified forms are possible regarding the equipment and algorithm utilised. In particular, it is possible to make use of a number of values differing from 16 to perform the calculation of a means value of the energy of the noise on a channel.

On the other hand, the acquisition in series of the 16 values may be replaced by an acquisition in parallel, in particular if the device produced is intended to equip a receiver making use of a fixed frequency oscillator instead of the wobbulated oscillator, and of a bank of filters instead of a single filter for the IF stages. The acquisition in parallel of the 16 values offers the advantage of a higher sweeping speed as compared to acquisition in series, for one and the same sub-range.

It is easy to produce detector means 10 in such manner that they process analog signals and not digital signals: the analog/digital converter 31 is omitted; the delay device 32 and the comparator 33 are of analog type; a digital/analog converter is added to provide an analog value of the threshold S" to the comparator 33.

It lies within the capability of one versed in the art to produce means 8 for detection of pulsed noises, in which these are not detected by the temporal coincidence of the signals received on two different frequencies, but by their brief duration. The two reception channels sweep one and the same frequency at two instants separated by a period ΔT. A pulsing interference transmission of extremely brief duration is not detected twice on this same frequency with an interval lasting ΔT. By contrast, a non-interference transmission is received on both channels with an interval ΔT. If ΔT is constant, the non-interference signals may be resynchronised by means of a time delay device, and they may be detected by coincidence. The value of ΔT is selected in such manner as to exceed the length of most of the pulsed interference signals.

A modification of the receiver consists in making use of an intermediate frequency filter independent of the filters utilised for the device for reducing the false alarm ratio, since it is unnecessary to have the same pass band for monitoring on the one hand, and for noise measurement, on the other hand.

We claim:

1. Device for reducing the false alarm ratio for a radio-electric monitor receiver having a first output delivering a logic alarm signal when a signal is received on a monitored frequency, and a second output delivering a value for the energy of the signal received, comprising
   a logic gate having an input coupled to the first output of the monitor receiver, having a validation input, an inhibition input and an output forming the output of the device,
   means for comparing the energy of the signal received by the monitor receiver with respect to a variable value S", having a first input connected to the second output of the monitor receiver, a second input receiving the value S", and an output supplying a logic signal to the validation input of the gate in order to validate the same when the signal received has a energy value higher than S", means for detecting a pulsed noise signal in a band centered on the frequency monitored and for comparing its energy with respect to a variable value S', having a first input connected to the second output of the monitor receiver and having a second input receiving the value S' and an output connected to the inhibition input of the gate, for inhibiting the same when a pulsed noise signal has an energy value exceeding S';

means connected to the second output of the monitor receiver for determining a value B for the energy of noise signals in a frequency band encompassing the frequency monitored and calculating the values S' and S" as a function of B.

2. Device according to claim 1, in which the means for detecting a pulsed noise signal and for comparing its energy to the value S', comprise:

a first receiver device which has a tuning frequency f equal to the frequency monitored and which has an output supplying a value for the energy of the signal received;

a second receiver device which has a tuning frequency $f + \Delta f$, in which $\Delta f$ is a fixed value exceeding the maximum frequency excursion of the transmissions to be monitored, having an output providing a value for the energy of the signal received;

a first and a second comparator having first inputs connected, respectively, to the outputs of the receiver devices, having a common second input receiving the value S' and each having an output;

a first and a second monostable multivibrator having inputs connected, respectively, to the outputs of the first and second comparators, and each having an output;

a logic gate having two inputs connected, respectively, to the two outputs of the monostables and having an output coupled to said inhibition input.

3. Device according to claim 1, for a monitor receiver of which a tuning frequency varies, in which the means for detecting a pulsed noise signal and for comparing its energy to the value S' comprise:

a first receiver device which has tuning frequency f identical to the frequency monitored, and having an output providing a value for the energy of the signal received;

a second receiver device which has a tuning frequency which assumes the value f after a delay $\Delta T$ as compared to the tuning frequency of the first receiver device, $\Delta T$ being a value exceeding the maximum duration of the pulsed noise signals and having an output providing a value for the energy of the signal received;

a first and a second comparator having first inputs connected, respectively, to the outputs of the receiver devices, having a second common input receiving the value S', and each having an output;

logic gate means having two inputs coupled, respectively, to the two outputs of the comparators and having an output coupled to said inhibition input.

4. Device according to claim 1, in which the value S" is equal to the sum of a fixed value and of the value B.

5. Device according to claim 1, in which the value S' is equal to the sum of a fixed value and of the value B.

6. Device according to claim 1, for a monitor receiver of which a tuning frequency is varied to sweep a frequency range, in which the means or determining a value B for the energy of the noise signals comprises:

an energy value delivering device having an output which at regular intervals delivers a sequence of values e for the energy received on adjacent channels within a band of constant width centered on f;

a calculator device having an input connected to the output of the delivering device and having an output supplying the value B, this value being calculated at regular intervals by establishing, for each interval the mean of 2n values e corresponding to n channels situated below and n channels situated above the frequency monitored for each interval considered, the number n of channels and their width being selected sufficiently large to render negligible the fluctuations of the values B calculated successively and the energy e received on a channel centered on the frequency monitored not being taken into account for calculating the value B;

said device for said monitor receiver further comprising a delay device having an input connected to the first output of the monitor receiver and an output connected to the input of the logic gate, the delay of which in particular, compensates for the period of sweeping the n channels corresponding to the mean value B calculated for the interval considered.

7. Device according to claim 1, in which the means of determining a value B for the energy of the noise signals, comprises;

a number 2n of receiver devices having 2n outputs which respectively deliver a value for the energy received at an identical instant on n channels which central frequency exceeds the frequency monitored, and on n channels which central frequency is lower than the frequency monitored.

a calculator device having 2n inputs connected, respectively, to the 2n outputs of the receiver devices, and having an output, for calculating a mean value B of the 2n values.

8. Device according to claim 6 or 7, in which the calculator device replaces any value of the energy received on a channel exceeding a predetermined value, by the last value of B which had been calculated.

* * * * *